United States Patent

Shaver et al.

(10) Patent No.: US 7,313,707 B2
(45) Date of Patent: Dec. 25, 2007

(54) SYSTEMS AND METHODS FOR CONFIGURING PORTS

(75) Inventors: Charles N. Shaver, Cypress, TX (US); Larry W. Kunkel, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 409 days.

(21) Appl. No.: 10/796,370

(22) Filed: Mar. 9, 2004

(65) Prior Publication Data

US 2005/0204070 A1 Sep. 15, 2005

(51) Int. Cl.
*G06F 1/00* (2006.01)
*G06F 3/00* (2006.01)

(52) U.S. Cl. .................. 713/300; 710/8; 710/15; 710/38; 710/72

(58) Field of Classification Search ........ 713/300–340; 710/8–12, 15–19, 31–32, 36–38, 58–63, 710/72–74
See application file for complete search history.

(56) References Cited

U.S. PATENT DOCUMENTS

| | | | | |
|---|---|---|---|---|
| 5,664,123 A | * | 9/1997 | Lee et al. ................ | 710/62 |
| 5,675,814 A | * | 10/1997 | Pearce .................... | 713/324 |
| 6,061,800 A | * | 5/2000 | Chiu ....................... | 713/300 |
| 6,229,538 B1 | * | 5/2001 | McIntyre et al. ......... | 715/734 |
| 6,567,921 B1 | * | 5/2003 | Guziak .................... | 713/322 |
| 6,590,587 B1 | * | 7/2003 | Wichelman et al. ...... | 715/736 |
| 6,657,534 B1 | * | 12/2003 | Beer et al. ............... | 340/3.1 |
| 7,043,646 B2 | * | 5/2006 | Enami et al. ............. | 713/300 |
| 2002/0089806 A1 | * | 7/2002 | Hamilton et al. ......... | 361/227 |
| 2003/0117176 A1 | | 6/2003 | Tardieux et al. | |
| 2003/0191886 A1 | * | 10/2003 | Teshima et al. .......... | 711/100 |
| 2004/0230846 A1 | * | 11/2004 | Mancey et al. ........... | 713/300 |
| 2005/0144498 A1 | * | 6/2005 | Lin ......................... | 713/600 |
| 2006/0093102 A1 | * | 5/2006 | McElvaney .............. | 379/88.17 |

* cited by examiner

*Primary Examiner*—Christopher Shin

(57) ABSTRACT

Systems, methodologies, media and other embodiments associated with configuring a port are described. One exemplary system embodiment includes a computing system that includes a port configured to operably connect an external device to the computing system. The example system may also include a mode controller operably connected to the port and that is configured to configure the port between a powered mode and a non-powered mode in accordance with a programmatically selected port configuration.

27 Claims, 6 Drawing Sheets

SYSTEMS AND METHODS FOR CONFIGURING PORTS

BACKGROUND

Some electronic devices such as a computer may include one or more serial ports that allow connection to an external peripheral device like a modem. If a peripheral device required power from the computer, the serial port could be changed to a powered mode. However, to change the serial port mode, the computer would need to be shut down, its cover removed, and one or two jumpers would need to be changed within the electronics. If a computer has four configurable ports that used two jumpers per port, a user could possibly need to move eight jumpers to reconfigure all four ports. In some computers, the manufacturer pre-configures the ports to be powered or not powered by performing the same process. However, once configured and the housing is closed, a customer has no indication of which mode the serial port is configured in. If a port is in a powered mode, an external device that does not require power should not be connected into the powered port. Manually configuring serial ports between powered mode and non-powered mode can be time consuming and may need special knowledge of the internal electronics of a computer.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
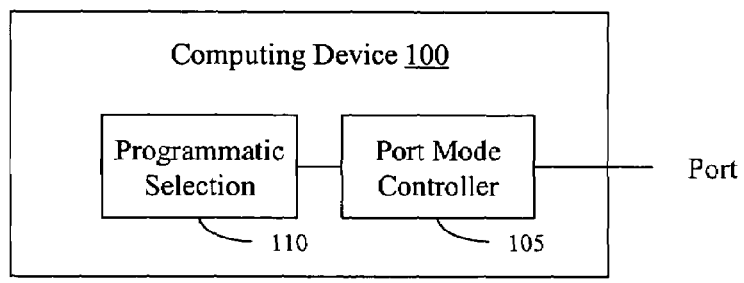
FIG. 1 illustrates an example computing device having a configurable port.

Example systems, methods, computer-readable media, and other embodiments are described herein that are associated with configurable ports. For example, a port can be configured between a powered mode and a non-powered, standard mode by programmatically setting the mode of the port. A mode indicator can also be displayed that indicates to a user what mode the port is operating in.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Illustrated in FIG. 1 is an example computing device 100 that includes at least one configurable port. In the following examples, the port will be described with reference to a 9-pin serial port connector, but it will be appreciated that the port may have different types of connectors and different numbers of pins. The port can be used to connect external devices, such as a modem or other electronic device, to the computing device 100. Certain types of external devices operate with their own power source but other devices are designed to receive power from the port of the computing device 100. To control the port between different operating modes, a port mode controller 105 is provided.

The port mode controller 105 is operably connected to the port and configured to configure the port between a powered mode and a non-powered mode. In one example, the port mode controller 105 is configured with logic. The computing device 100 may also include logic that allows the port to be configured by a programmatic selection 110 that identifies the mode in which the port should operate. The port mode controller 105 can then configure the port in accordance with the programmatic selection 110. In this manner, the port can be automatically configured without having to open the computing device 100 and manually set selected jumpers to configure the port.

Figure 2:
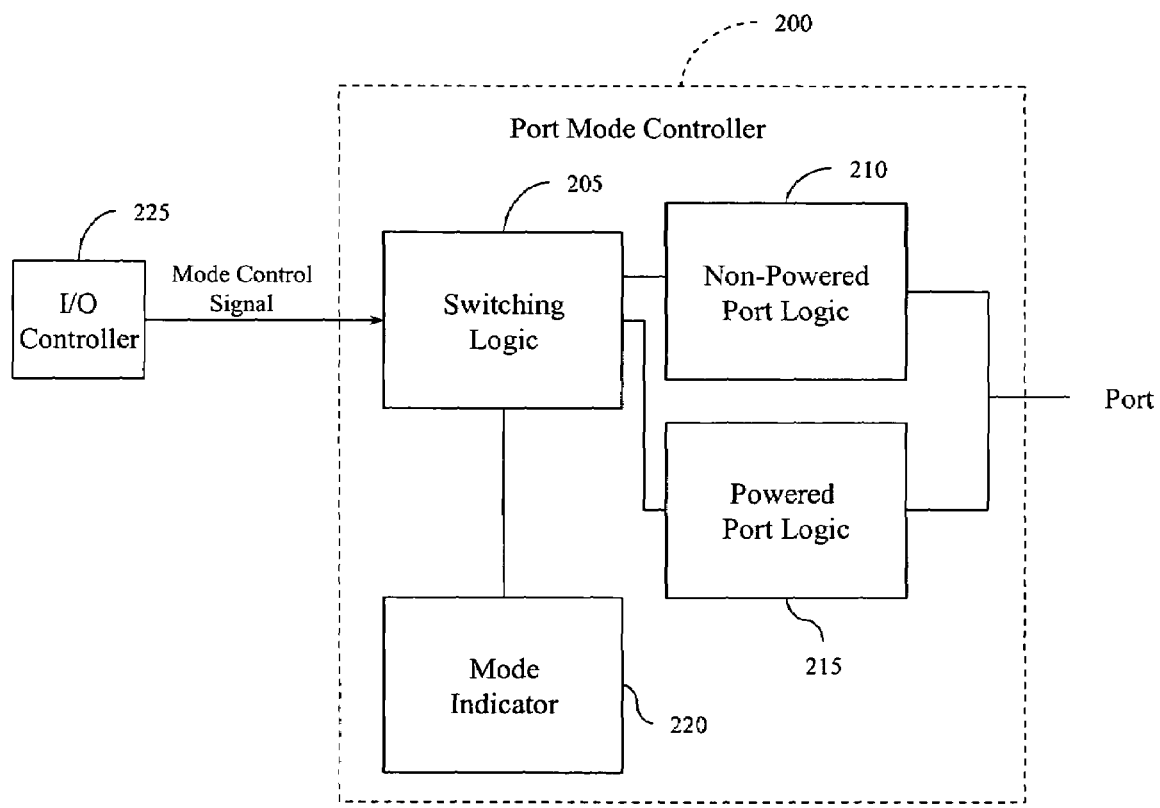
FIG. 2 illustrates an example port mode controller for configuring a port.

Illustrated in FIG. 2 is an example diagram of a port mode controller 200 that can configure a port by switching between at least two modes of operation such as a non-powered mode and a powered mode. In one example, a circuit can be operably connected to at least one pin in the port and can be configured to provide a desired function associated with the pin such as a signal processing function. The signal processing function can be provided by a non-powered port logic 205. To facilitate the powered mode, a powered port logic 210 is also connected to the port and configured to apply power to the port when the port is operated in the powered mode. It will be appreciated that the non-powered port logic 205 and the powered port logic 210 can be part of the same circuit or be separate logic components.

To control the mode configuration of the port, a switching logic 215 can be configured to switch operations between the non-powered port logic 205 and the powered port logic 210. For example, if the port is to be configured in a non-powered mode (also referred to as a standard operating mode), the switching logic 215 can cause the non-powered port logic 205 to be active and provide a signal processing function to the port. As such, the powered port logic 215 is caused to be disconnected from the port so that no power is supplied. In a powered mode, the switching logic 215 is configured to connect the powered port logic 210 to the port to apply power, and to disconnect the signal processing function of the non-powered port logic 205.

A mode indicator 220 may also be provided that is configured to identify whether the port is in the powered mode or in the non-powered mode. In one example, the mode indicator 220 includes at least one light-emitting diode that provides a visual indication of the mode. The mode indicator 220 can be configured as an on/off light, a bi-colored diode, multiple diodes, or other type of optical signal. In another example, the mode indicator 220 can be configured as processor executable instructions that cause a processor to determine a current mode of the port and to display a visual indication of the current mode. For example, software can be provided that determines the port mode and can display a mode indicator on a display screen. The mode indicator can be a graphical object displayed on a display screen in an operating system task bar, a configuration menu, or other window to indicate whether a port is in powered mode or standard mode. In one example, to determine the current port mode, port configuration settings can be read from a memory as will be described below.

As previously described, the port mode controller 200 can control the port in accordance with a programmatically selected port configuration. For example, logic can be provided that allows a user to select a desired mode for a selected port. Based on the selected mode, a mode control signal can be set high or low to control the switching logic 215. It will be appreciated that other types of signals can be used for the mode control signal.

In another example, the mode control signal can be controlled by an input/output (I/O) controller 225 that can be configured to receive the port configuration that is programmatically selected and, in response thereto, set the mode control signal. The I/O controller 225 may be a super I/O chip made by Standard Microsystems Corporation like an SMCS LPC47M10x, which is a 100. Pin Enhanced Super I/O Controller. Other types of super I/O chips are available and may also be used. The mode control signal can be connected to a general purpose input/output (GPIO) pin and/or a general purpose output (GPO) pin of the I/O controller 225 and connected to the switching logic 215. The mode control signal can be connected to a stand-by power well, in the south bridge, or other configured output connection in the I/O controller 225. The programmically selected port setting can be supplied to the I/O controller 225 as an input signal that is configured to toggle the GPO assigned to the mode control signal between High (e.g. "1") and Low (e.g. "0").

Figure 3:
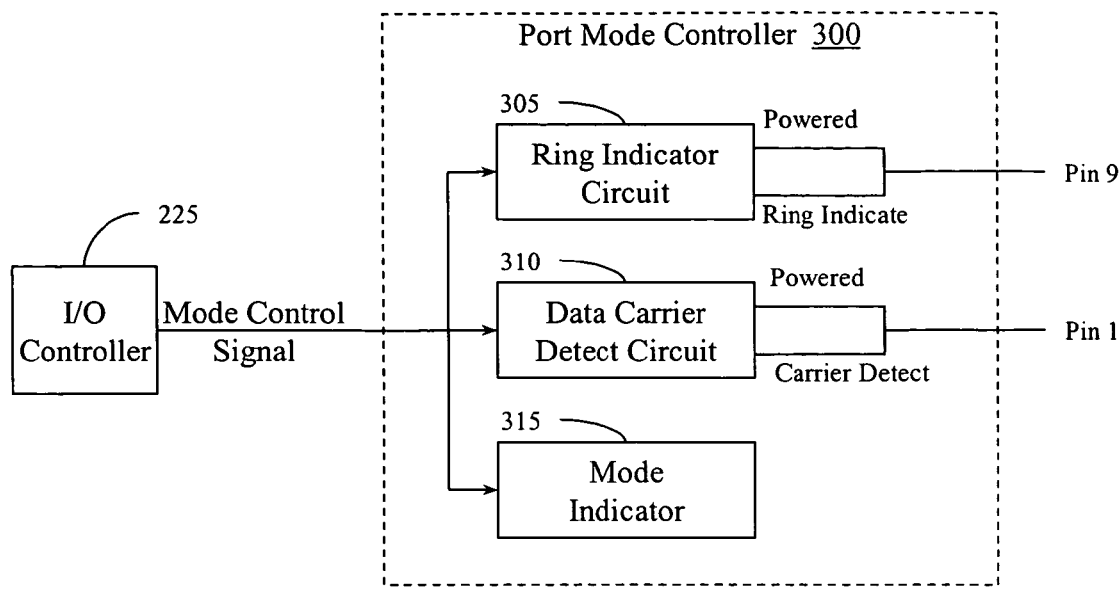
FIG. 3 illustrates another example of a port mode controller configured to change modes of a port.

Illustrated in FIG. 3 is another example of a port mode controller 300 configured to control a ring indicate pin and a carrier detect pin of a serial port to function in either a standard, non-powered mode or a powered mode. For example, pin 9 of a serial port can be operably connected to a ring indicator circuit 305 that is configured to indicate whether a ring signal is received on pin 9 and notifies the I/O controller 225. A data carrier detect circuit 310 can be operably connected to pin 1 of the serial port and configured to notify the I/O controller 225 when a carrier is detected on pin 1. It will be appreciated that the ring indicate function and the carrier detect function are examples of signal processing functions as described with reference to FIG. 2 and the non-powered port logic 205. Of course, other types of functions can be provided and the present systems and methods are not limited to the example functions and/or example pin connections.

As part of the ring indicator circuit 305 and the data carrier detect circuit 310, switching logic (not shown) can be provided to connect and disconnect portions of the respective circuits to control the mode of the connected pins 1 and 9, and thus, control the mode of the port. For example, if a mode control signal from the I/O controller 225 represents a powered mode, the ring indicate function of the ring indicator circuit 305 would be disconnected and power would be applied to pin 9. Similarly, the carrier detect function of the data carrier detect circuit 310 would be disconnected and power would be applied to pin 1. If the mode control signal represents a non-powered mode (standard mode), power would be disconnected from both pins 1 and 9, and the signal processing functions of the circuits would be connected and activated. Additionally, a mode indicator 315 can be provided to indicate a current mode of the port based on the mode control signal. An example circuit is shown with reference to FIG. 4.

Figure 4:
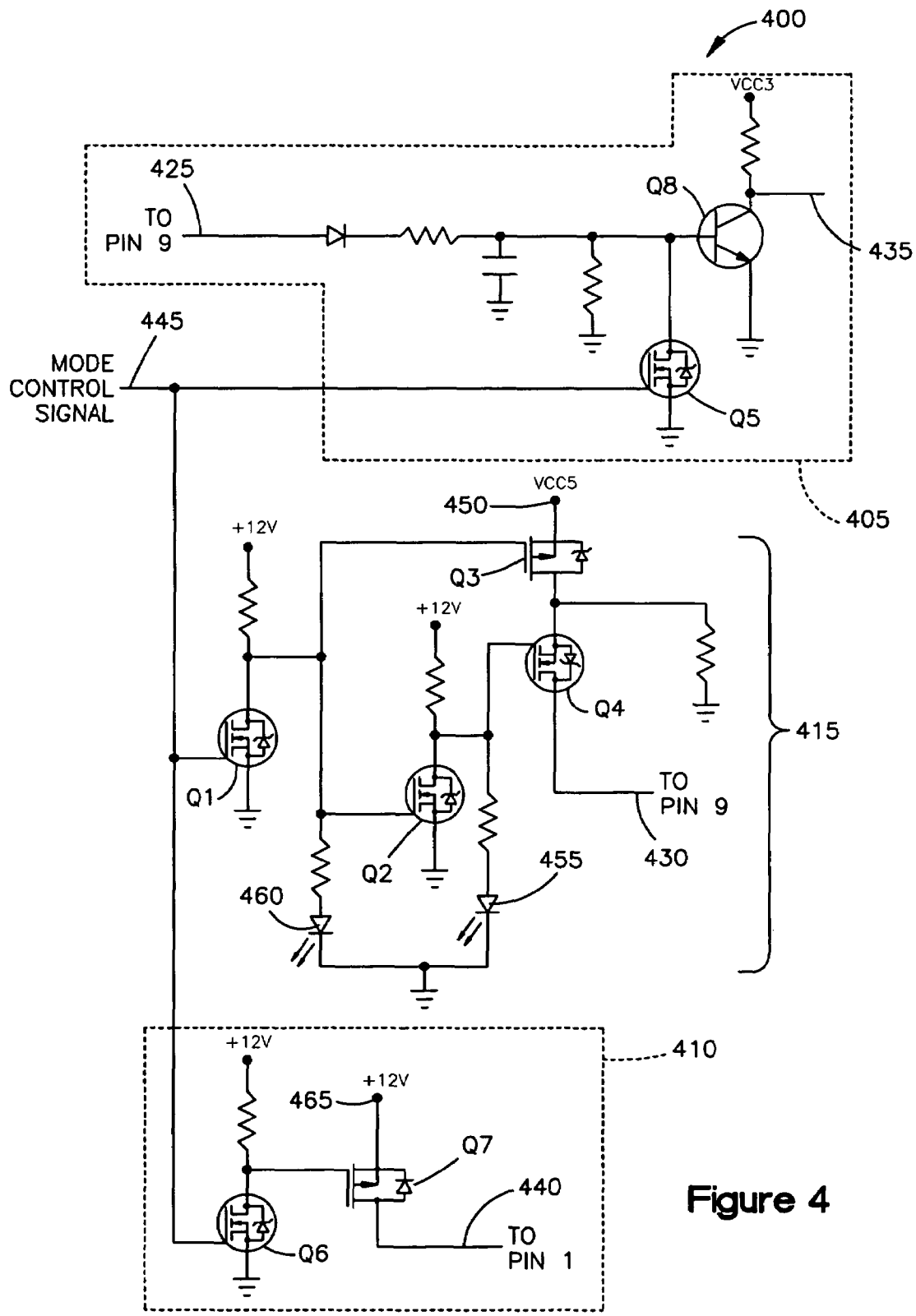
FIG. 4 illustrates an example circuit diagram including a ring-indicate function and a data carrier detect function that can selectively configure a port between a powered mode and a standard mode.

Illustrated in FIG. 4 is an example circuit diagram that can be used to configure a port between a powered and non-powered mode. The mode controller circuit 400 can include a ring indicate circuit 405, a data carrier detect circuit 410, and a power circuit 415 that is part of the ring indicate circuit 405. The ring indicate circuit 405 can be connected to pin 9 at line 425 and the power circuit 415 can be connected to pin 9 at line 430. Line 435 can be connected as input to an I/O controller to indicate the presence of a ring signal on pin 9. The carrier detect circuit 410 can be connected to pin 1 of the port at line 440 which can also be provided as input to the I/O controller to indicate a carrier signal.

The circuit 400 can be switched between powered mode and non-powered mode by control line 445 that carries a mode control signal. In the example, the control line 445 is configured to represent a powered mode when the signal line is "high" (e.g. "1") and represents a standard or non-powered mode when the signal line is "low" (e.g. "0"). The states of the mode control circuit 400 and thus states of the connected port are shown in Table 1.

TABLE 1

| MODE CONTROL | PIN 1 | PIN 9 |
| --- | --- | --- |
| Powered Mode (Signal Line "High") | 12 V | 5 V |
| Non-Powered Mode (Signal Line "Low") | Carrier Detect | Ring Indicate |

When the control signal 445 is set to "high," meaning powered mode, pin 1 (through the carrier detect circuit 410) receives 12 volts and pin 9 (through the powered circuit 415) receives 5 volts. A mode indicator can also be provided like a light emitting diode (LED), a software indicator, and/or the like to indicate to a user what is the current mode. In the example circuit 415, an LED 455 would turn on when in powered mode. When the control signal 445 is "low,"

meaning non-powered mode, the carrier detect function is operably connected to pin 1 and the ring indicate function is operably connected to pin 9. Additionally, the power is disconnected from pins 1 and 9. An example LED 460 can be provided that would turn on to indicate the non-powered mode.

Looking more closely at the mode controller circuit 400 in FIG. 4, the circuit 400 includes a number of field effect transistors (FET) labeled as Q1-Q8. Transistors Q1, Q2, Q5, and Q6 are n-channel FETs that are configured to control the switching functions of the circuit 400 between the powered mode and the non-powered mode. Transistors Q3, Q4, and Q7 are configured to pass power to the port pins and are power-type FETs. For example, transistors Q3, Q4 and Q7 can be p-channel FETs configured to turn on in response to a negative source. It will be appreciated that other types and combinations of transistors can be used, as well as other electronic components, to provide the functionality of the circuit.

With reference to the ring indicate circuit 405, when the control signal 445 is "high" indicating a powered mode, transistor Q5 turns "on." When Q5 turns on, this grounds the base of transistor Q8 and disconnects the external signal from a connected device (e.g. modem) on line 425 (connected to pin 9). At the same time, transistor Q1 causes power passing transistor Q3 to turn on, and Q2 turns off which causes Q4 to turn on. As a result, 5 volts of power from power source 450 is applied to pin 9 at line 430. Also provided are mode indicators such as light-emitting diodes 455 and 460 connected to the power circuit 415. In the powered mode, LED 455 is illuminated while in a standard non-powered mode, LED 460 is illuminated.

Regarding the carrier detect circuit 410, when the mode control line 445 is "high" indicating a powered mode, FET Q6 turns "on" which grounds the drain of the transistor and turns on transistor Q7 (a p-channel FET). This causes 12 volts of power from power source 465 to be applied to pin 1 on line 440. When the control line 445 is "low" indicating a non-powered mode, transistor Q6 and Q7 are turned "off" which disconnects the power to line 440 and allows the carrier detect signal to be transmitted as normal. For example, the carrier detect line 440 can also be connected into a serial port transceiver that translates the +12 volt signal and −12 volt signal to a digital signal before transmitting the signal to the I/O controller.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks. While the figures illustrate various actions occurring in serial, it is to be appreciated that various actions could occur substantially in parallel.

Figure 5:
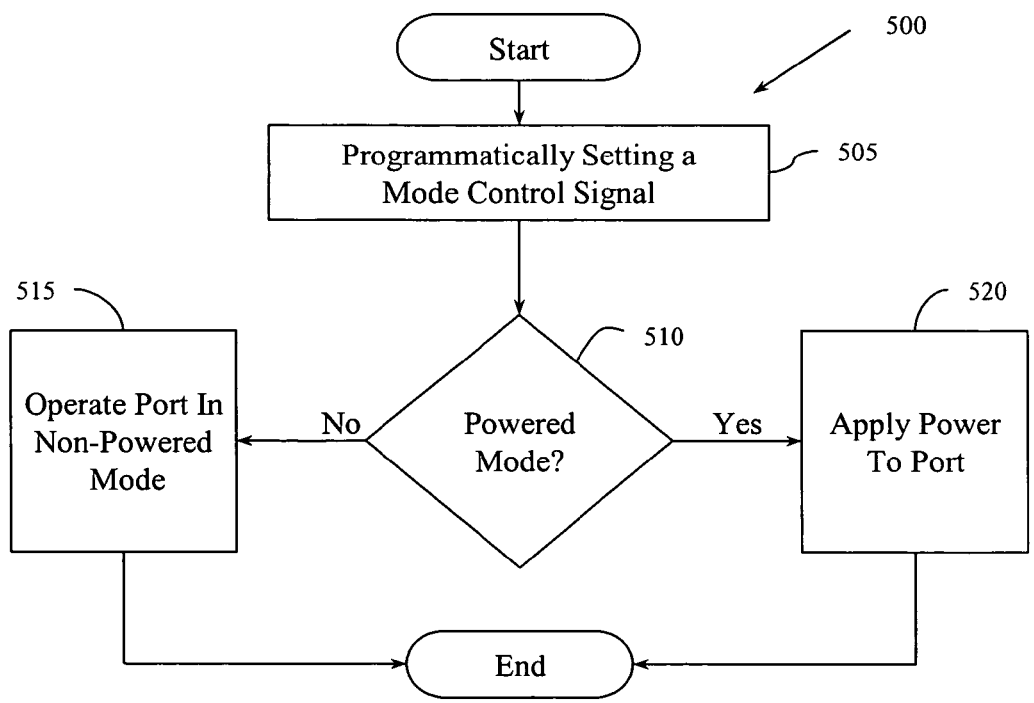
FIG. 5 illustrates an example methodology associated with configuring the mode of a port.

Illustrated in FIG. 5 is an example methodology 500 associated with controlling modes of a port. The illustrated elements denote "processing blocks" that may be implemented in logic. In one example, the processing blocks may represent computer software instructions or groups of instructions that cause a computer or processor to perform an action(s) and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. The diagram of FIG. 5, as well as the other illustrated diagrams, do not depict syntax of any particular programming language. Rather, the diagrams illustrate functional information one skilled in the art could use to fabricate circuits, generate computer software, or use a combination of hardware and software to perform the illustrated processing.

It will be appreciated that electronic and software applications may involve dynamic and flexible processes such that the illustrated blocks can be performed in other sequences different than the one shown and/or blocks may be combined or separated into multiple components. Blocks may also be performed concurrently, substantially in parallel, and/or at substantially different points in time. They may also be implemented using various programming approaches such as machine language, procedural, object oriented and/or artificial intelligence techniques. The foregoing applies to all methodologies described herein.

With reference to FIG. 5, a mode control signal can initially be programmatically set (block 505). For example, using software, firmware, or other logic, a user can select a port to be configured in a powered mode or a non-powered mode. If in a powered mode at decision block 510, power is applied to the port (block 520). If needed, other portions of logic and/or circuits connected to the port that are associated with a standard operating function can be disconnected. If at decision block 510 the port mode is in a non-powered mode, the port is operated in a non-powered mode (block 515). This includes disconnecting the power from the port.

Figure 6:
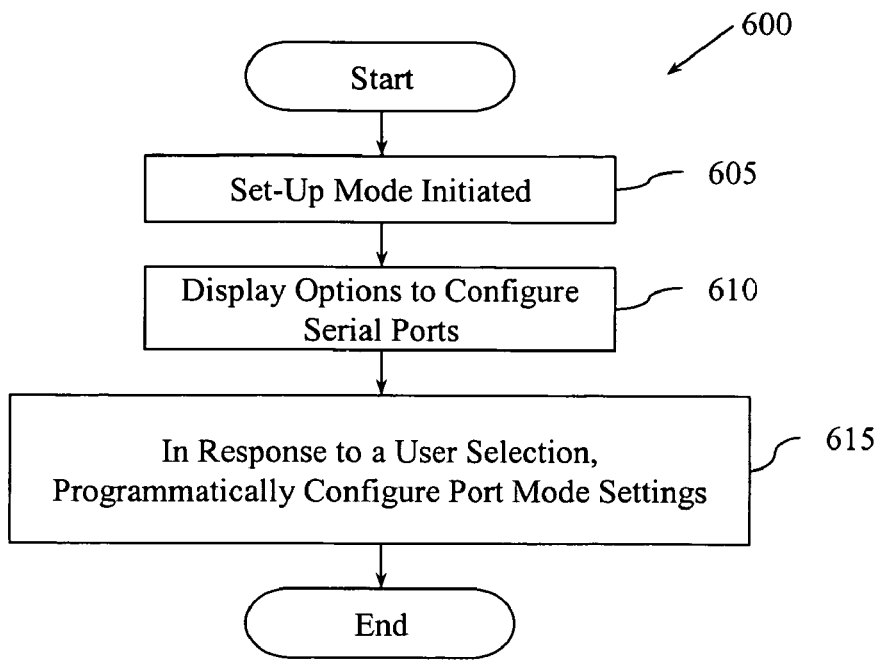
FIG. 6 illustrates an example methodology associated with programmatically configuring port mode settings.

Illustrated in FIG. 6 is an example methodology 600 associated with programmatically configuring a port. The methodology 600 may begin in response to a set-up mode being initiated within a device that includes one or more ports (block 605). For example, some computers may be configured to have a function key that is defined to initiate a set-up mode. In one example, certain Hewlett-Packard and Compaq computers include an F10 Set-up Mode that can be initiated during boot-time of a computer by pressing the F10 key. Within the set-up mode, various system settings and configurations can be reviewed and modified by a user, which occurs through the system BIOS.

As part of the set-up mode, an option can be displayed that allows a user to configure one or more serial ports in the device (block 610). For example, a current or default mode can be initially shown for each port and the process may allow the user to change the mode of a port by making a selection. As previously described, a port can be configured as being in a powered mode or a non-powered mode (e.g. standard mode). By selecting a desired mode, a flag or other type of port setting can be stored in a memory such as a CMOS. Thus, in response to the user selection, port mode settings can be programmatically configured (block 615). The port mode settings can then be used to control the mode configuration of the serial ports by generating a mode control signal based on the port settings as previously described.

Figure 7:
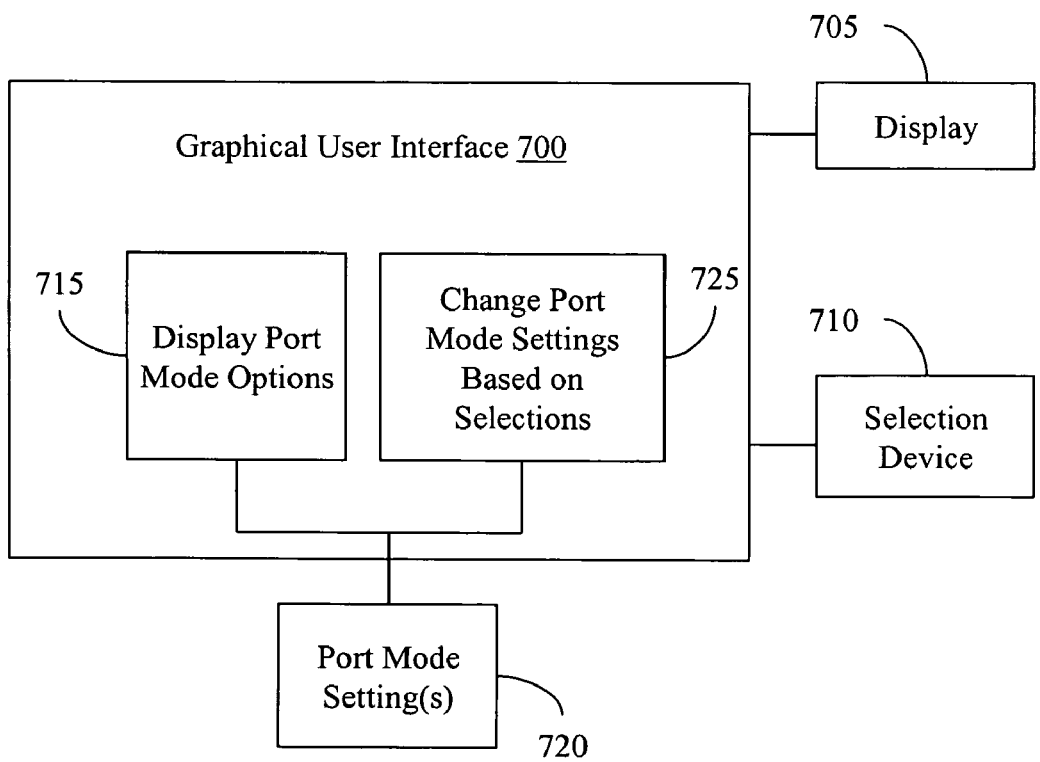
FIG. 7 illustrates an example graphical user interface associated with configuring port mode settings.

With reference to FIG. 7, an example graphical user interface 700 is illustrated that can be configured to perform the method of FIG. 6 (or a similar method) on a computer system. An example computer system can include at least a display 705 and a selection device 710 that can interface and operate with the graphical user interface 700. The graphical user interface 700 can be embodied as software provided by a computer-readable medium having processor executable instructions. The instructions can be operable to perform a method of providing and selecting from a set of data entries on the display 705 that cause a selected port to be configured with a selected mode.

The graphical user interface 700 can include executable instructions 715 configured to cause the computer to retrieve a set of data entries, where a data entry represents port mode options and/or current port settings. For example, current port mode settings can be read from a memory 720. The port modes settings for each configurable port can then be caused to be displayed on the display 705 including mode options that include at least a powered mode and a non-powered mode.

Executable instructions 725 can be configured to cause the computer to respond to one or more data entry selection signals that are received indicative of the selection device 710 selecting one or more data entries from the set of data entries displayed (e.g. clicking on and selecting a port mode option, pressing a key to change a port mode, and the like). In response to the one or more data entry selection signals, one or more port mode settings can be programmatically changed by storing and/or modifying the mode settings in the memory 720. This can include, for example, setting a bit in a CMOS that is associated with a selected serial port (e.g. serial port 1). Each configurable port can have an associated port mode setting (e.g. mode bit) that can be programmatically configured. The port mode settings 720 can then be used to set a mode control signal that configures a port (e.g. as described in FIGS. 2-4).

The graphical user interface 700 can be embodied as processor executable instructions that can be initiated, for example, during a set-up mode such as the F10 set-up as described previously. As another example, the graphical user interface 700 may be part of a configuration application and/or control panel software that allows a user to review and modify port mode settings.

Figure 8:
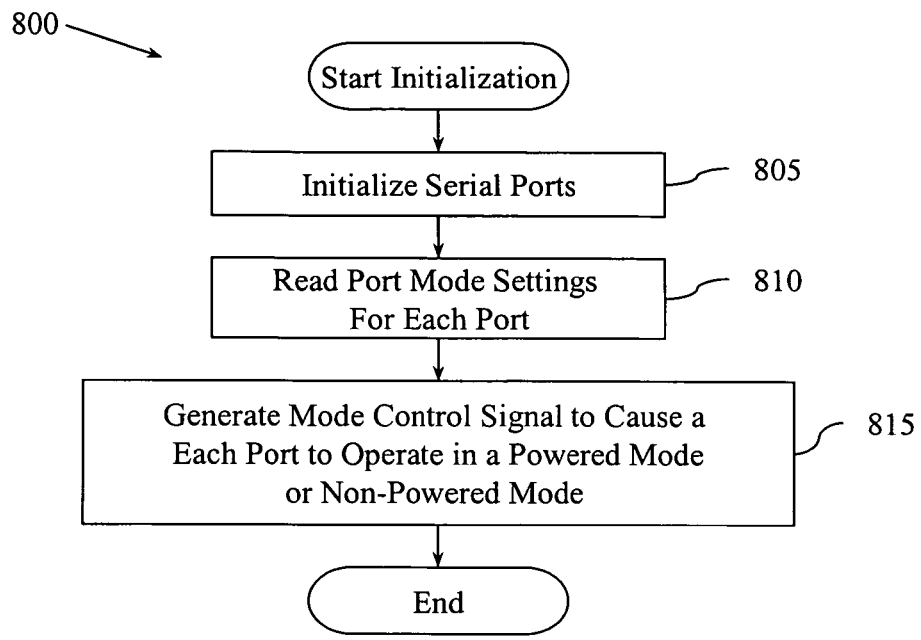
FIG. 8 illustrates an example methodology associated with initializing a port and controlling a mode of the port.

Illustrated in FIG. 8 is an example methodology 800 associated with initializing serial port(s) in an electronic device. For example, the serial ports can be initialized (block 805) as part of a system initialization that can occur during power-up and/or boot-time. During the initialization, port mode settings can be read for each configurable port (block 810). As previously described, the port mode settings can be programmatically set by a user and stored in a non-volatile memory. A mode control signal can then be generated based on the port mode setting for each configurable port (block 815). The mode control signal can cause each port to operate in a powered mode or a non-powered mode based on the port mode setting for that port.

As described previously, the mode control signal can control a port controller that can switch a port between the powered mode and non-powered mode. For example, a port and selected pins within the port can be operably connected to one or more circuits that provide functionality to the pin. For example, a circuit can include a standard operating function for a pin like a ring indicator function and another portion of the circuit may be a power circuit that can apply power to the pin. Based on the mode control signal, either the standard functioning circuit or the power circuit can be connected or disconnected to the pin, which changes the mode of the port. Another example is described with reference to FIG. 9.

Figure 9:
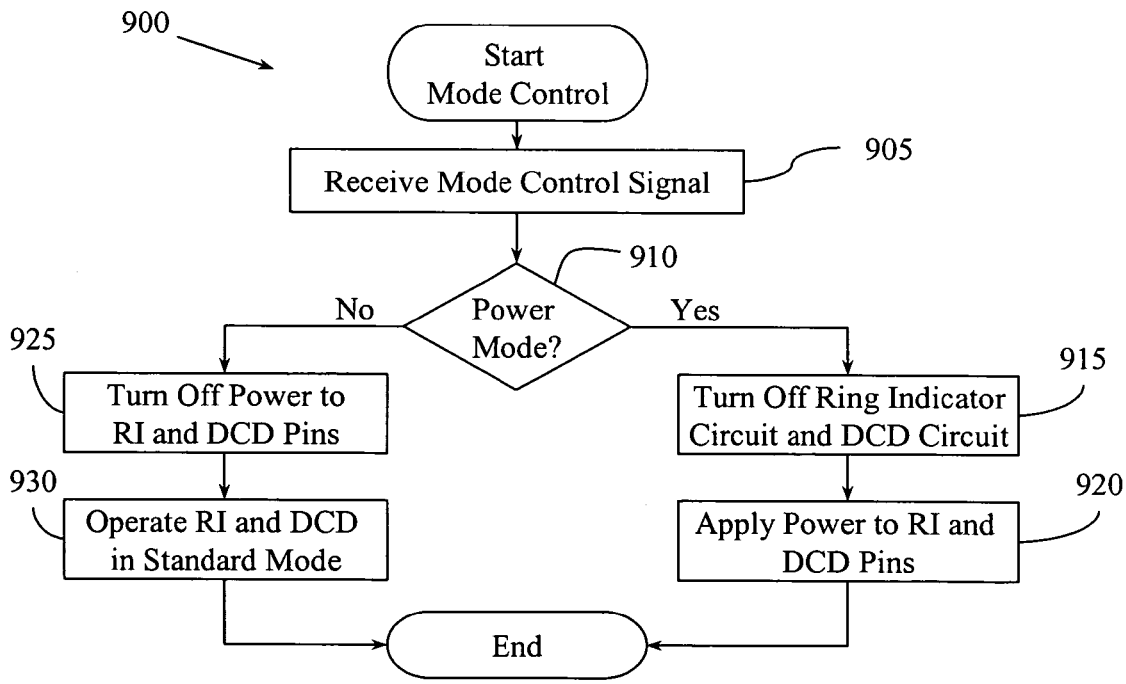
FIG. 9 illustrates an example methodology associated with configuring a port between a powered mode and a non-powered mode.

Illustrated in FIG. 9 is another example of a methodology 900 associated with controlling the mode of a port between a powered mode and a non-powered mode. The methodology will be described with reference to a port configuration that includes one pin operably connected to a ring indicator circuit and another pin operably connected to a data carrier detect circuit. Examples of this type of circuit are shown in FIGS. 3 and 4. Of course, other types of circuits and other functions can be associated with a port that can be dynamically connected and disconnected.

The port mode configuration may begin when a mode control signal is received (block 905). If the mode control signal indicates a power mode at block 910, the ring indicator circuit and data carrier detect (DCD) circuit are turned off or otherwise disconnected from their associated pins (block 915). Power is then applied to the ring indicate pin and the data carrier detect pin (block 920). If at block 910 the mode control signal indicates a non-powered mode, power is turned off from the ring indicate and data carrier detect pins (block 925), or otherwise disconnected from the pins. The port is then operated in a standard mode by providing its normal function of ring indicate and data carrier detect (block 930).

Figure 10:
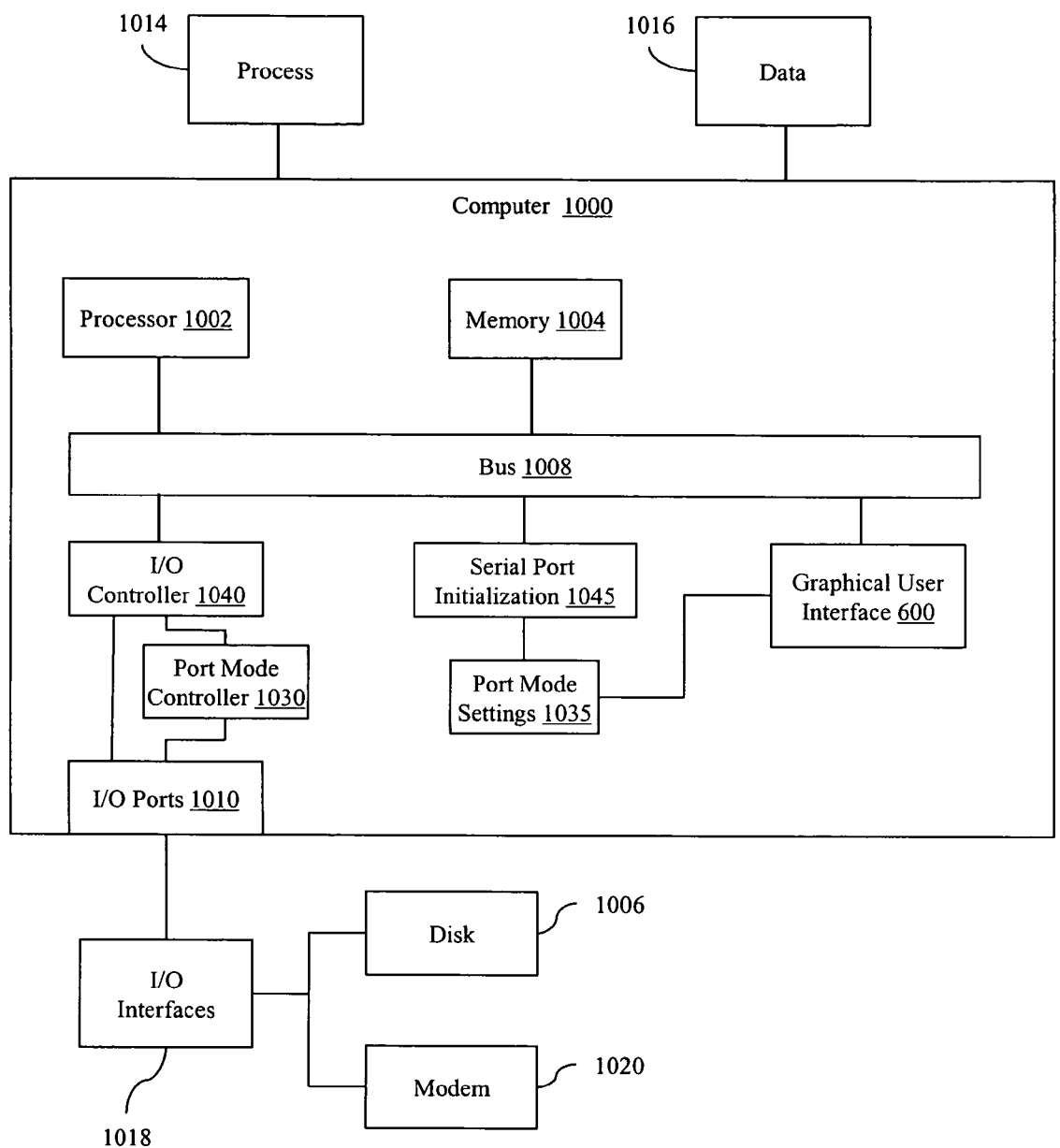
FIG. 10 illustrates an example computing device in which example systems and methods illustrated herein can operate.

FIG. 10 illustrates a computer 1000 that includes a processor 1002, a memory 1004, and input/output ports 1010 operably connected by a bus 1008. In one example, the computer 1000 may include a port mode controller 1030 configured to dynamically configure one or more selected ports from the I/O ports 1010 between a powered mode and a non-powered mode. As described previously, port modes settings 1035 can be programmatically set by a user and are used to control the operation of the port mode controller 1030. An I/O controller 1040, like a super I/O chip, can be provided to process input/output communications between the I/O ports 1010 and the other components of the computer 1000.

A serial port initialization routine 1045 can be provided that executes during boot-time to configure the I/O ports 1010 and can be configured to read the port mode settings 1035. The port mode settings 1035 can then be inputted to the I/O controller 1040 and cause the port mode controller 1030 to re-configured selected ports. To allow a user to programmically set the port mode settings 1035, a graphical user interface or other logic can be provided like the graphical user interface 600 described with reference to FIG. 6.

Generally describing an example configuration of the computer 1000, the processor 1002 can be a variety of various processors including dual microprocessor and other multi-processor architectures. The memory 1004 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 1006 may be operably connected to the computer 1000 via, for example, an input/output interface (e.g., card, device) 1018 and an input/output port 1010. The disk 1006 can include, but is not limited to, devices like a magnetic disk drive, a solid state disk drive, a floppy disk drive, a tape drive, a Zip drive, a flash memory card, and/or a memory stick. Furthermore, the disk 1006 can include optical drives like a CD-ROM, a CD recordable drive (CD-R drive), a CD rewriteable drive (CD-RW drive), and/or a digital video ROM drive (DVD ROM). The memory 1004 can store processes 1014 and/or data 1016, for example. The disk 1006 and/or memory 1004 can store an operating system that controls and allocates resources of the computer 1000.

The bus 1008 can be a single internal bus interconnect architecture and/or other bus or mesh architectures. While a single bus is illustrated, it is to be appreciated that computer 1000 may communicate with various devices, logics, and peripherals using other busses that are not illustrated (e.g., PCIE, SATA, Infiniband, 1394, USB, Ethernet). The bus 1008 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 1000 may interact with input/output devices via i/o interfaces 1018 and the input/output ports 1010. Input/output devices can include, but are not limited to, a keyboard, a microphone, a pointing and selection device, a modem 1020, cameras, video cards, displays, disk 1006, network devices, and the like. The input/output ports 1010 can include but are not limited to, serial ports, parallel ports, and USB ports.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A computing system, comprising:
    a port configured to operably connect an external device to the computing system, where the port is a serial port including at least a ring indicator pin and a data carrier detect pin;
    a mode controller operably connected to the port, and configured to configure the port between a powered mode and a non-powered mode in accordance with a programmatically selected port configuration;
    a ring indicator circuit connected to the ring indicator pin;
    a data carrier detect circuit connected to the data carrier detect pin; and
    the mode controller being operably connected to the ring indicator circuit and the data carrier detect circuit where in the powered mode, the mode controller is configured to change functionality of both the ring indicator circuit and the data carrier detect circuit to cause the ring indicator pin and the data carrier detect pin to receive power.

2. The computing system of claim 1 where the port is a serial port including one or more pins.

3. The computing system of claim 2 where the mode controller includes:
    a non-powered port logic connected to the port and being configured to operate the serial port in the non-powered mode;
    a powered port logic connected to the port and being configured to apply power to the port to operate the port in the powered mode; end
    a switching logic configured to switch operations between the non-powered port logic and the powered port logic based on the progranunatically selected port configuration.

4. The computing system of claim 3 where the non-powered port logic and the powered port logic are operably connected to at least one pin of the port.

5. The computing system of claim 1 further including a mode indicator configured to identify whether the port is in the powered mode or in the non-powered mode.

6. The computing system of claim 5 where the mode indicator includes at least one light emitting diode.

7. The computing system of claim 5 where the mode indicator includes processor executable instructions tat cause a processor to determine a current mode of the port and display a visual indication of the current mode.

8. The computing system of claim 1 further including a graphical user interface configured to allow a user to programmatically select between the powered mode and the non-powered mode for the port, and in response to a selection, causing the port configuration to be set.

9. The computing system of claim 1 further including a plurality of ports configured to operably connect an external device to the computing system.

10. A method for controlling a port, comprising:
    progranunatically setting a mode control signal that identifies whether a port is to be in a powered mode or a non-powered mode, where the progranirnatically setting includes:
        displaying port configuration options including at least the powered mode and the non-powered mode;
        allowing a user to make a configuration selection from the port configuration options for a selected port; and
    setting the mode control signal in accordance with the configuration selection;
    if the mode control signal indicates the powered mode, applying power to the port; and
    if the mode control signal indicates the non-powered mode, disconnecting power to the port and configuring the port to process data signals.

11. The method of claim 10 where the port includes a pin connected to a ring indicate circuit configured to provide a ring indicate function that indicates whether a ring signal is received by the port, and when the mode control signal is set for the powered mode, disconnecting the ring indicate function.

12. The method of claim 10 where the port includes a pin connected to a data carrier detect circuit configured to provide a data carrier detect function that indicates whether a data carrier is detected by the port, and when the mode control signal is set for the powered mode, disconnecting the data carrier detect function.

13. The method of claim 10 further including:
setting a port mode flag for the selected port in response to the configuration selection; and
reading, during an initialization of the port, the port mode flag and setting the mode control signal based on the port mode flag.

14. The method of claim 10 where the programmatically setting step includes generating an electrical signal to set the mode control signal.

15. A system, comprising:
a port having a plurality of pins configured to operably connect the system to an external device;
a circuit operably connected to at least one pin in the port and configured to provide a signal processing function;
a port mode controller operably connected to the circuit and configured to change a mode of the circuit between providing the signal processing function and providing power; and
a graphical user interface configured to allow a user to select a port configuration for the port including a powered mode and a non-powered mode, where the port mode controller changes the mode of the circuit based on the port configuration and in response to the non-powered mode, the port code controller disconnects power to the pod and causes the circuit to provide the signal processing function to the port.

16. The system of claim 15 where the circuit includes a powered port logic configured to apply power to the at least one pin; and
where the pod mode controller includes a switching logic configured to disconnect the signal processing function of the circuit and connect the powered port logic when the port configuration indicates the powered mode.

17. The system of claim 15 further including an input/output controller chip configured to process input/output signals between the system and the port, the input/output controller being configured to generate a mode control signal tat causes the port mode controller to change the mode of the circuit where the mode control signal is generated in accordance wit the port configuration.

18. The system of claim 15 including a memory for storing the port configuration.

19. The system of claim 15 where the circuit includes a ring indicate circuit configured to provide a ring indicate function.

20. The system of claim 15 where rho circuit includes a carrier detect circuit configured to detect a presence of a carrier signal on the port.

21. The system of claim 15 further including a mode indicator configured to visually indicate the port configuration of the port.

22. A computer-readable medium storing processor executable instructions operable to perform a method, the method comprising
providing a port mode option that indicates whether a port is to be in a powered mode; and
programmatically configuring the port mode option based on a user selection where the port mode option is configured to cause logic to change an operating mode of the port including in response to the port mode option being a non-powered mode, causing the logic to disconnect power to the port and allowing the port to communicate data signals.

23. The computer-readable medium of claim 22 further including instructions operable to:
determine the port mode; and
display an indicator that represents the port mode.

24. A system, comprising:
port means for operably connecting an external device to the computing system; and
mode controller means for configuring the port between a powered mode and a non-powered mode in accordance with a port configuration that is programmatically selectable in response to a user selected option, where in the non-powered mode, power is removed from the port and the port continues to communicate signals.

25. The system of claim 24 further including a means for programmatically selecting the port configuration.

26. The system of claim 24 further including mode indicator means for indicating the port configuration.

27. In a computer system having a graphical user interface comprising a display and a selection device, a method of providing and selecting from a set of data entries on the display, the method comprising:
displaying a port mode option for a selected port where the port mode option includes at least a powered mode and a non-powered mode;
receiving a data entry selection signal indicative of the selection device selecting the port mode option; and
configuring the port mode option in response to the data entry selection signal, the port mode option being configured to cause the selected port to function in the powered mode or in the non-powered mode;
where in the non-powered mode, the configuring includes removing power from the port and allowing the port to communicate data signals.

* * * * *

UNITED STATES PATENT AND TRADEMARK OFFICE
CERTIFICATE OF CORRECTION

PATENT NO.         : 7,313,707 B2
APPLICATION NO. : 10/796370
DATED                 : December 25, 2007
INVENTOR(S)      : Charles N. Shaver et al.

Page 1 of 1

It is certified that error appears in the above-identified patent and that said Letters Patent is hereby corrected as shown below:

In column 12, line 17, in Claim 3, delete "end" and insert -- and --, therefor.

In column 12, line 20, in Claim 3, delete "progranunatically" and insert -- programmatically --, therefor.

In column 12, line 32, in Claim 7, delete "tat" and insert -- that --, therefor.

In column 12, line 44, in Claim 10, delete "progranunatically" and insert -- programmatically --, therefor.

In column 12, line 46, in Claim 10, delete "progranirnatically" and insert -- programmatically --, therefor.

In column 13, line 28, in Claim 15, delete "pod" and insert -- port --, therefor.

In column 13, line 33, in Claim 16, delete "pod" and insert -- port --, therefor.

In column 13, line 41, in Claim 17, delete "tat" and insert -- that --, therefor.

In column 13, line 43, in Claim 17, delete "wit" and insert -- with --, therefor.

In column 13, line 49, in Claim 20, delete "rho" and insert -- the --, therefor.

In column 14, line 6, in Claim 22, after "comprising" insert -- : --.

Signed and Sealed this

Twenty-seventh Day of May, 2008

JON W. DUDAS
*Director of the United States Patent and Trademark Office*